United States Patent [19]
Dreier et al.

[11] Patent Number: 6,100,842
[45] Date of Patent: Aug. 8, 2000

[54] CHAINED LOCATION DETERMINATION SYSTEM

[75] Inventors: Scott Dreier, San Francisco, Calif.; Nicholas Talbot, Ashburton, Australia

[73] Assignee: Trimble Navigation Limited, Sunnyvale, Calif.

[21] Appl. No.: 09/026,800

[22] Filed: Feb. 20, 1998

[51] Int. Cl.⁷ .............................. G01S 5/02; H04B 7/185
[52] U.S. Cl. ............................. 342/357.08; 342/357.01; 342/357.03; 342/357.09; 342/357.06; 701/213
[58] Field of Search ..................... 342/357.01, 357.03, 342/357.08, 357.09, 357.06; 701/213, 215

[56] References Cited

U.S. PATENT DOCUMENTS

| | | | |
|---|---|---|---|
| 5,148,179 | 9/1992 | Allison | 342/357 |
| 5,311,154 | 5/1994 | Brown | 342/357 |
| 5,477,458 | 12/1995 | Loomis | 364/445 |
| 5,512,905 | 4/1996 | Nichols et al. | 342/357 |
| 5,519,620 | 5/1996 | Talbot et al. | 364/449 |
| 5,646,630 | 7/1997 | Sheynblat et al. | 342/357 |
| 5,757,314 | 5/1998 | Gounon et al. | 342/357 |
| 5,841,026 | 11/1998 | Kirk et al. | 73/178 R |
| 5,850,341 | 12/1998 | Fournier et al. | 364/424.07 |

OTHER PUBLICATIONS

B. Hofmann–Wellenhof, H. Lichtenegger, and J. Collins, "Global Positioning System Theory and Practice," 3rd revised edition, pp. 179–197, Springer–Vertag Wien, 1994.

Alfred Leick, "GPS Satellite Surveying," 2nd edition, pp. 247–285, John Wiley & Sons, Jan. 1995.

Shaowie Han and Chris Rizos, "Comparing GPS Ambiguity Resolution Techniques," pp. 54–56 and 58–60, GPS World, Oct. 1997.

*Primary Examiner*—Thomas H. Tarcza
*Assistant Examiner*—Dao L. Phan
*Attorney, Agent, or Firm*—John F. Schipper

[57] ABSTRACT

Methods for chaining together two or more navigation or survey stations to complete a project, where only adjacent stations in the chain have contact with each other. The location of a mobile reference station is determined and corrected, if necessary, using location determination (LD) signals from an LD system such as GPS, GLONASS, LEO or the like. The location of a first rover station is determined using RTK information and signal differencing from the mobile reference station. The location of a second rover station is determined using RTK information and signal differencing from the first rover station, in a chain of location determinations. Standard electronic distance measuring equipment and techniques can be used to supplement these methods in an integrated approach. Location consistency checks are provided by using RTK analysis to redetermine the location of one or more preceding stations in the chain. The invention can be used to direct a moving vehicle toward a selected structure for landing, tie-up, maintenance, refueling and similar activities.

13 Claims, 5 Drawing Sheets

CHAINED LOCATION DETERMINATION SYSTEM

FIELD OF THE INVENTION

This invention relates to a surveying/navigation system having three or more stations simultaneously providing location information.

BACKGROUND OF THE INVENTION

Procedures for surveying and navigation have changed markedly over the last 20 years, due to improvements in computer processing and the availability of location determination systems, such as GPS, GLONASS and LEO, although the goal of a survey remains the same: to provide precise location coordinate information for selected locations in a region.

Satellite-based location determination (LD) technology is used extensively for navigation, for mapping and for determination of survey locations, among other uses. The accuracy of an LD technology, such as GPS, is limited by errors due to activation of selective availability (SA), additional time delay due to propagation of signals in the ionosphere and the troposphere, satellite LD signal source timing errors, receiver timing errors, receipt of multipath signals and other similar sources.

Differentially corrected GPS (DGPS) technology had been developed to compensate for these error sources, especially the first three of these sources. DGPS technology uses a reference station receiver whose location is precisely known and which compares the theoretical pseudorange and/or carrier phase measurements it should receive, based on its known location, with the measurements actually made on the GPS signals received at the reference station. The differences between the theoretical measurements and the actual measurements are broadcast for use by other nearby GPS mobile receivers or rovers, in order to approximately correct for the measurements made at these rover stations.

In many applications, one limiting factor is the need for a mobile receiver to remain within a line-of-sight from the reference station, in order to receive the DGPS signal with low bit error rate. For example, in a terrain with mountains or with a heavy forest, high radiofrequency signals (above 100–300 MHz) cannot be received without risk of fading unless line-of-sight communication is used. Where the mobile receiver and reference station are separated by a distance of the order of 10 kilometers (km) or more, it is often difficult to ensure uninterrupted line-of-sight communication. This is often true in navigation applications and in surveying applications.

The prior art discloses use of a satellite-based location determination (LD) system for determining and displaying location coordinates of a selected location in a survey or for a navigation system. Prior art devices often involve use of a base survey receiver or station, which is preferably stationary during the survey and whose location is known very accurately, and of a mobile survey receiver or station whose location is estimated using LD signals received from several LD signal sources that are spaced apart from the mobile survey receiver. However, in some situations, more than two receivers (e.g., a mobile receiver and more than one rover receiver) are needed, because the mobile receiver cannot conveniently communicate with the base receiver using only line-of-sight signal transmission.

A total station survey instrument includes a visual sighting tool with instruments for distance measurement and angular orientation measurement. Recent improvements have incorporated a location determination system that can be used to more accurately determine the location, and possibly the angular orientation, of the survey instrument. Several limitations exist in use of a conventional total survey station. First, it is difficult to quickly establish the angular orientation and absolute location of a local survey or datum. Many surveys are not related to a uniform datum but exist only on a localized datum. In order to accurately orient a survey to a global reference, such as astronomical north, a star observation for azimuth is often used that requires long and complicated field procedures. Second, if a survey is to be connected to a national or state geodetic datum, the survey sometimes must be extended long distances, often tens of kilometers or more, depending upon the proximity of the survey to geodetic control marks. Third, the electronic total survey station relies upon line-of-sight contact between the survey instrument and the rodman or pole carrier, which can be a problem in undulating terrains. Often, a sequence of links must be used to complete a survey, and the possibility for introducing errors increases with the number of links used.

The systems disclosed by background patents in these activities provide some, but not all, of the benefits of a linked or chained Satellite Positioning System (SATPOS) integrated with a terrestrial total station instrument. What is needed is a system that: (1) provides precise location coordinates for the endpoints of a separation vector between a reference station and a rover or mobile station; (2) provides approximate location coordinates of a moving reference station relative to a fixed reference station; and (3) optionally includes distance- and angle-measuring sensors to aid in rapid determination of the separation vector between reference station and rover station(s).

SUMMARY OF THE INVENTION

These needs are met by the invention, which provides a survey and navigation system that combines SATPOS techniques with new and known survey and navigation techniques. The apparatus includes: (1) a first or base or reference station, having a location that is known with high accuracy (and preferably fixed), that receives SATPOS signals, and that determines and optionally transmits differential corrections for the SATPOS signals received by other, nearby receivers, and that provides a reference location for the survey or navigation activities; (2) a second or mobile reference station, having a movable (non-fixed) but determinable location, that is spaced apart from the base receiver and that receives the SATPOS signals, optionally receives the SATPOS differential correction signals, and acts as an intermediate mobile measurement unit for the survey or navigation activities; and (3) one or more additional mobile stations, referred to as "rover" stations, whose changing locations are to be determined from time to time as the survey or navigation proceeds. The mobile reference station and each of the rover stations receives SATPOS signals and determines its location using these signals and optionally receives and uses the SATPOS correction signals to correct the location of that station. A one-dimensional chain or two-dimensional array of two or more rover stations can be used in a survey or navigation project.

A SATPOS provides location determination signals from transmitters carried on two or more satellites, geostationary or non-geostationary; the SATPOS signals are received at a SATPOS signal antenna and associated SATPOS receiver/processor, located on or near the ground, and are analyzed to determine the SATPOS antenna location. SATPOS signals may be received from the GPS, GLONASS or LEO satellites, among others.

Each of the mobile reference station and the rover station(s) includes an SATPOS signal antenna and an SATPOS signal receiver/processor that receive and process SATPOS signals from the visible satellites. Each of the mobile reference station and the rover station(s) includes a communications antenna and receiver that receives the SATPOS correction signals and/or transmits or receives real time kinematic (RTK) information used in location determination. Use of RTK information is described by B. Hofmann-Wellenhof et al, *Global Positioning System Theory and Practice*, Springer Verlag, New York, third Edition, 1994, pp. 179–197, and in U.S. Pat. No. 5,519,620, issued to Talbot et al and incorporated by reference herein. Use of carrier phase signals and RTK information, which have a smaller associated wavelength, is preferred over use of code phase signals supplemented by differential correction signals for the code phase data. However, code phase signals supplemented with differential correction signals can be used in some instances, especially where Selective Availability is activated or where the station-to-station separation distance is tens of kilometers or more.

The mobile reference station optionally includes an electronic distance meter (EDM) and a digital theodolite, whose spatial orientation can be varied arbitrarily, connected to the station's receiver/processor, for transmitting electromagnetic waves having a selected wavelength or wavelength range and for determining the distance from the mobile reference station to a rover station by receipt of a return electromagnetic signal from the rover station, for determining the elevation difference, if any, between the mobile reference station and an object that is part of or attached to the rover station, and for determining the angular displacement between a selected reference line or plane that includes the mobile reference station and the object. This is especially useful for survey activities.

A responding rover station optionally includes an electronic distance meter responder, such as a prismatic mirror, adapted to receive the electromagnetic waves transmitted by the EDM and to provide a return electromagnetic signal that is received by the electronic distance meter at the mobile reference station. The mobile reference station and the responding rover station are connected by a communications link for transferring SATPOS measurement or correction data and other information from one station to the other station.

A survey or navigation chain, which includes the base reference station, a mobile reference station and one or more rover stations, serves as a communications link between the base reference station and any rover station in the chain and provides station-to-station communications between any two linked stations in the chain. This allows precisely determined location coordinates of the fixed reference station to be transferred through to the mobile reference station to provide a "seed" separation vector for a rover station. An error of 100 meters in location coordinates of the mobile reference station, which is common when GPS Selective Availability is activated, will produce at least 10 ppm errors in the components of a station-to-station separation vector for a rover station. Thus, the coordinates of the separation vector must be determined with an inaccuracy of no more than about one meter for reasonably precise applications (one ppm error or less).

In one embodiment, the location of the mobile reference station is initially known with high accuracy; an associated SATPOS receiver/processor is adapted for subsequently determining the difference, if any, between the "known" code phase signals or carrier phase signals the mobile reference station should receive at its known location, and the corresponding signals actually received at the mobile reference station. These SATPOS corrections are used at the mobile reference station to enhance the accuracy of the computed location of the mobile reference station or of a rover station in a chain. The location of each rover station, relative to the mobile reference station or relative to a preceding rover station in a chain of such stations, is determined using RTK information, which can provide location coordinates relative to the moving reference station location with an associated inaccuracy of no more than 1–5 cm.

In a second embodiment, the location of the mobile reference station relative to the base reference station is determined using RTK information, and the location of each rover station in a chain is determined as in the first embodiment.

The invention provides an enhanced total station, including a chain or array of spaced apart rover stations whose relative separation is known with high accuracy, as an integrated supplement to, or as a replacement for, survey or navigation equipment conventionally used.

Preferably, the station-to-station separation vector in a survey is determined using RTK information, or the accuracy of an EDM-determined separation vector is checked using RTK information, as part of an enhanced approach that relies upon EDM techniques and RTK techniques for location determination.

Several benefits accrue from this total station approach: (1) location coordinates of the mobile reference station are determined with meter-level (or less) inaccuracy so that the rover location is more precisely determined; and (2) estimation of carrier phase ambiguity for a separation between mobile reference station and rover station is easier if the mobile reference station location is more accurately known; (3) SATPOS signal processing can be done at the mobile reference station or at the rover station; (4) where the frequency of the station-to-station data link is selected appropriately, or where one or more signal repeaters is used to relay signals between the two stations, survey or navigation measurements are not limited to, and do not require, line-of-sight measurements between a mobile reference station and a rover station, once the phase integer ambiguities are resolved, and (5) systematic and random errors in the SATPOS and electro-optical measurements can be determined and reduced by combining the information from the two systems.

DESCRIPTION OF BEST MODES OF THE INVENTION

Figure 1:
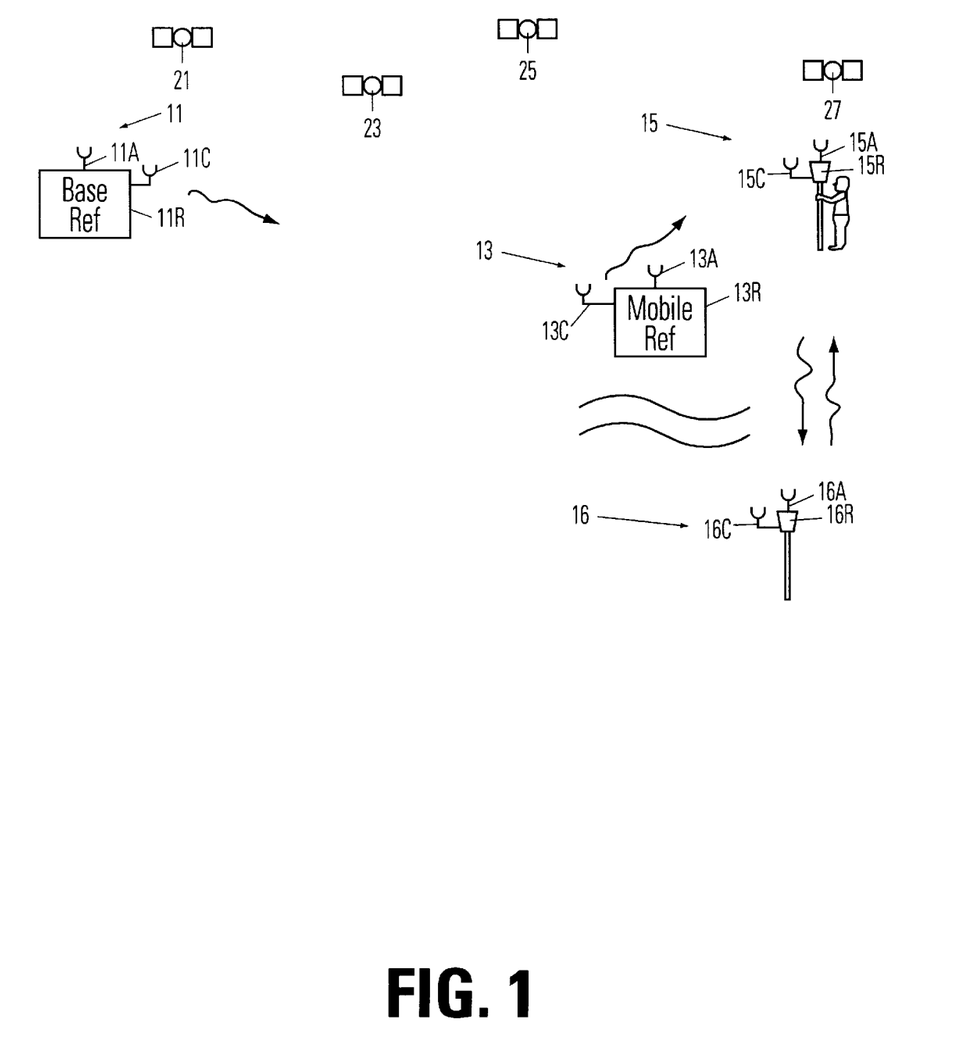
FIG. 1 illustrates one embodiment of the invention.

In FIG. 1, illustrating one embodiment, a base reference station 11 is stationed at a location that is preferably fixed and usually remote from the survey site or navigation region and is known with great accuracy. The base reference station 11 may be allowed to move, if its location is known at each of a sequence of selected time values. The base reference station 11 includes an SATPOS signal antenna 11A and an SATPOS signal receiver/processor 11R that receive and analyze SATPOS signals from two or more SATPOS signal sources 21, 23, 25, 27 and that determine the location of the base reference station from these received SATPOS signals. The base reference station 11 also includes a communications antenna and transmitter 11C that allows electromagnetic communication between the base reference station and a mobile reference station 13. An example of a base reference station is the TNL 4800, manufactured by Trimble Navigation, Sunnyvale, Calif.

The mobile reference station 13 includes an SATPOS signal antenna 13A and SATPOS signal receiver/processor 13R that receive and analyze SATPOS signals, preferably from the same SATPOS signal sources 21, 23, 25, 27 that are visible from the base reference station 11, and determine the location of the mobile reference station 13 from these received SATPOS signals. The mobile reference station 13 also includes a communications antenna and transmitter 13C that allows electromagnetic communication between the mobile reference station and another survey or navigation station, such as the base reference station 11 or a rover station 15 or 16.

Each rover station, such as 15, includes an SATPOS signal antenna 15A and SATPOS signal receiver/processor 15R that receive and analyze SATPOS signals, preferably from the same SATPOS signal sources 21, 23, 25, 27, and that determine the location of the rover station 15 from these received SATPOS signals. The rover station 15 also includes a communications antenna and transmitter 15C that allows electromagnetic communication between the rover station 15 and the mobile reference station 13 and/or another rover station 16. The rover station 16 is similarly equipped.

The base reference station 11 takes carrier phase and/or code phase observations for each SATPOS signal source. SATPOS corrections for these measurements are formatted and broadcast, using the communications antenna 11C, and are received by nearby stations, such as the mobile reference station 13 and/or the rover stations 15 and 16. The mobile reference station 13 typically uses the base reference station observations to compute the mobile reference station location, to an inaccuracy less than one meter.

Alternatively and preferably, the base reference station 11 transmits real time kinematic information that allows the mobile reference station 13 to compute its own location using a carrier phase single or double difference approach that is characteristic of RTK location determination. The carrier phase double difference method is discussed in U.S. Pat. No. 5,148,179, issued to Allison and incorporated by reference herein. Use of an RTK method relies, in part, on accurate knowledge of the location of an SATPOS participating reference station, such as the mobile reference station 13.

As measured at the receiver/processor, a carrier phase observation includes additive effects of: (1) the true range $RP_m(t)$ between the location of the satellite (p) at the time the carrier phase signal was transmitted and the location of the receiver antenna (m) at the time the carrier phase signal is received; (2) an integer number of cycles $NP_m(t)$ (ignoring a fractional part f of a cycle) corresponding to the distance between the satellite at transmission time and the receiver at the time t the signal is received; (3) satellite clock error $\Delta tP(t)$ at the time the carrier phase signal was transmitted; (4) receiver clock error $\Delta t_m(t)$ at the time the carrier phase signal is received; (5) phase advance $IP_m(t)$ introduced by propagation of the signal through the ionosphere (relative to propagation of the signal through a vacuum over the same distance); (6) phase retardation or delay $TP_m(t)$ introduced by propagation of the signal through the troposphere (relative to propagation of the signal through a vacuum over the same distance); (7) time delay $d_m(t)$ introduced in transmitting and processing the carrier phase signal after this signal is received at the receiver antenna (designated as receiver line bias), due to cable lengths, signal processing delays and the like; (8) time delay $dP(t)$ introduced in processing the carrier phase signal before this signal is transmitted by the satellite (designated as satellite line bias), due to cable lengths, signal processing delays and the like; and (9) a multipath signal contribution and random carrier phase measurement noise $eP_m(t)$ ("extraneous receiver error") at the receiver. The notation used here is close to that adopted by A. Leick, *GPS Satellite Surveying*, Wiley-Interscience, Second Edition, 1995, pp. 247–272. The ionospheric time delay effect depends upon the carrier frequency f used by the satellite to communicate.

The carrier phase observation $\phi P_m(t)$ is thus expressible by the relation $$\phi P_m(t) = RP_m(t) + \lambda NP_m(t) + c\Delta tP(t) - c\Delta t_m(t) - IP_m(t) + TP_m(t) + d_m(t) + dP(t) + eP_m(t), \quad (1)$$

where c is the velocity of light in a vacuum and $\lambda$ is the carrier wavelength. In an RTK approach, the equation for carrier phase for a transmitting satellite (number p) and for a receiver (number m) is used to form a double difference equation involving signals transmitted by each of two satellites (p1 and p2) and received at each of two receivers (m1 and m2, here the base reference station and mobile reference station). The mobile reference station location is determined to within an inaccuracy of as little as 5–20 cm, if the base station-mobile station separation distance is any distance up to about 50 km. The maximum location inaccuracy generally improves (grows smaller) as the maximum base station-mobile station separation distance decreases. Less preferably, a single difference equation, involving two satellites and a single receiver, or two receivers and a single satellite, can also be formed and used to analyze carrier phase.

Once the location of the mobile reference station 13 is determined, using DSATPOS signals or (preferably) RTK information, the location of the first rover station 15 is determined, preferably using an RTK double difference approach and relying upon knowledge of the mobile reference station location. Because the mobile station-first rover station separation distance is relatively small, normally no more than 1–2 km, the maximum inaccuracy for the first rover station location, relative to the mobile reference station location, is correspondingly reduced, to no more than 1–5 cm.

After the location of the first rover station 15 is determined, using an RTK approach, the location of the second rover station 16 can be determined, using double differencing and knowledge of the first rover station location, if the second rover station does not communicate directly with the mobile reference station 13. If the second rover station 16 communicates directly with the mobile reference station 13, the second rover station location can be determined using an RTK approach and knowledge of the mobile reference station location, without involving the first rover station 15 A rover station, 15 or 16, need not be visible from the mobile reference station location, if electromagnetic communication exists between these stations. Proceeding in this manner, one can "chain" together a sequence of rover stations 1, 2, ..., N (N≧2), in which rover stations number n and n+1 (n=1, 2, ..., N−1) communicate with each other but the rover station locations are otherwise unconstrained. If N rover stations are chained or arrayed together in this manner, the maximum inaccuracy in location of any station relative to the mobile reference station location is about 2N cm, and the rms inaccuracy is about 2√N cm.

In a survey mode, the invention optionally uses certain electro-optical survey measurements, implemented by use of one or more signal retro-reflectors that operate in the microwave, infrared, visible or ultraviolet wavelength ranges, to determine the bearing, length of, and/or height difference of a separation vector joining the first and second stations. Use of this equipment and these measurements is discussed in U.S. Pat. No. 5,512,905, issued to Nichols et al and incorporated by reference herein. This often requires that the two stations have line-of-sight visual contact. One object of the invention is to implement carrier phase positioning, which can be accurate to within a few centimeters, as opposed to the usually less accurate code phase positioning, using the SATPOS satellite signals. Carrier phase positioning is implemented by causing two or more SATPOS stations to track a common group of SATPOS satellites. The measurements are then merged and either processed in real time, or post-processed, to obtain data useful in determination of the location of any stationary or mobile SATPOS station near an SATPOS instrument station. Real time location determination requires transfer of SATPOS data between a rover station and a mobile reference station, using a data link that does not rely upon direct line-of-sight communication.

Figure 2:
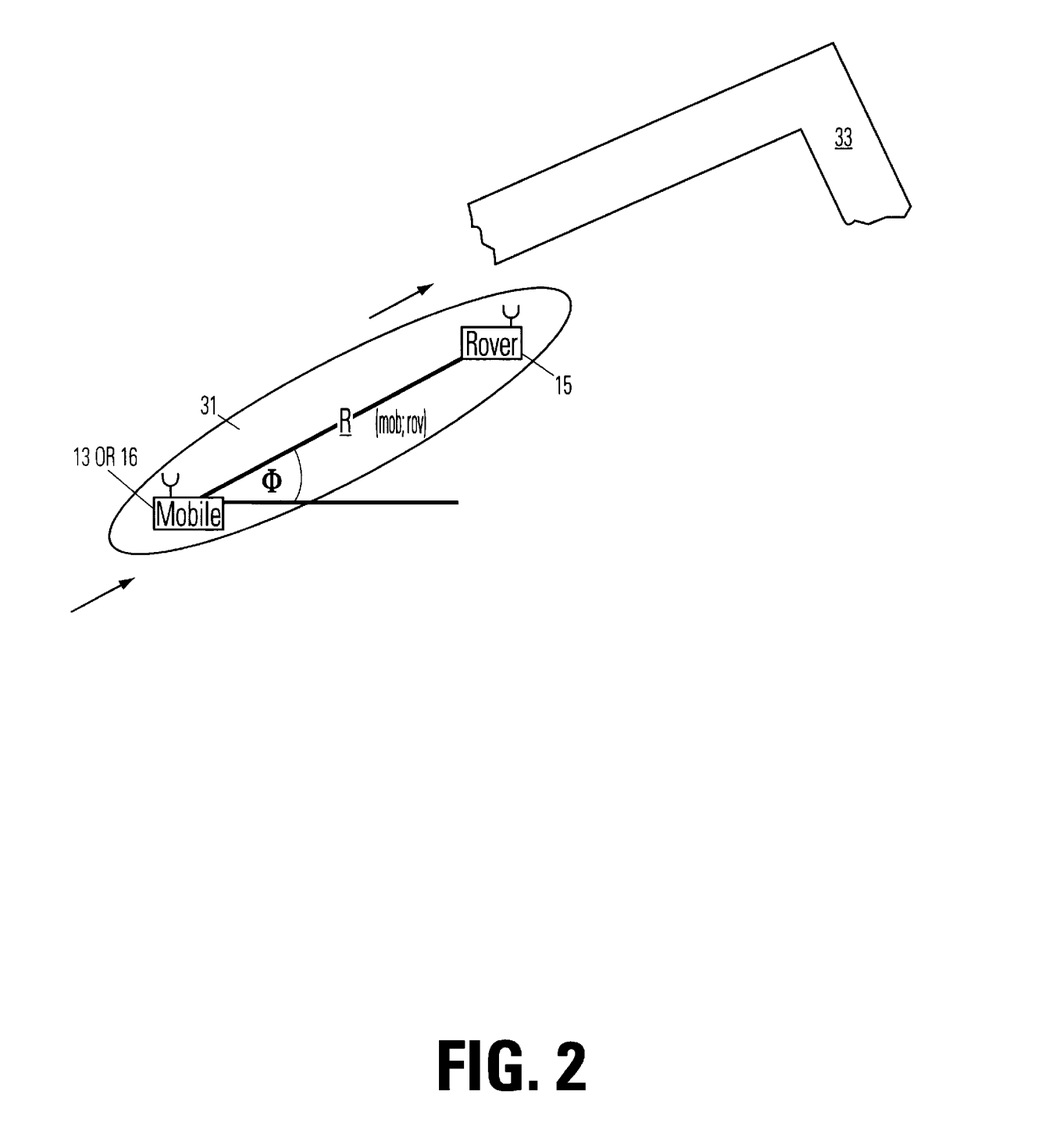
FIGS. 2 and 3 illustrate use of the invention in vehicle navigation.

FIG. 2 illustrates use of the invention in a navigation activity, to determine the location and angular heading of a vehicle 31, such as a waterborne vehicle. A mobile reference station 13 is located at a first station location on the vehicle 31 or, alternatively, at a location toward which the vehicle is steered or directed. Preferably, the first station location relative to the vehicle 31 itself is accurately known. A rover station 15 is located at a second station location, also known relative to the vehicle 31 itself, on the vehicle. Preferably, the distance between the first station location and the second station location on the vehicle 31 is fixed. The mobile reference station 13 receives either RTK information or differential SATPOS information from a base reference station 11, which may be remote from the vehicle 31, and determines the mobile reference station location with at most a small inaccuracy, as discussed in the preceding. The rover station 15 receives RTK information from the mobile reference station and determines the rover station location with at most a small inaccuracy.

Because the location of the mobile reference station 13 and of the rover station 15 are known relative to the vehicle 31 itself, the angular heading (represented by an angular variable φ in FIG. 2) of a separation vector R(mob;rov), and thus of the vehicle 31 itself, is known as soon as the absolute locations of these two stations become known. An angular heading of any other line, associated with the vehicle 31 and lying in a plane containing the separation vector R(mob;rov), can be determined with reference to the angular heading of the vector R(mob;rov). If the vehicle 31 is a water-borne vehicle, the vehicle can be guided into or out of a slip or berth 33 for the vehicle or toward another water-borne vehicle or other structure for refueling, using the invention. If the vehicle 31 is a land vehicle, such as a long non-articulated truck, the vehicle can be guided to or away from a refueling, loading dock, docking station or other structure 33.

Figure 3:
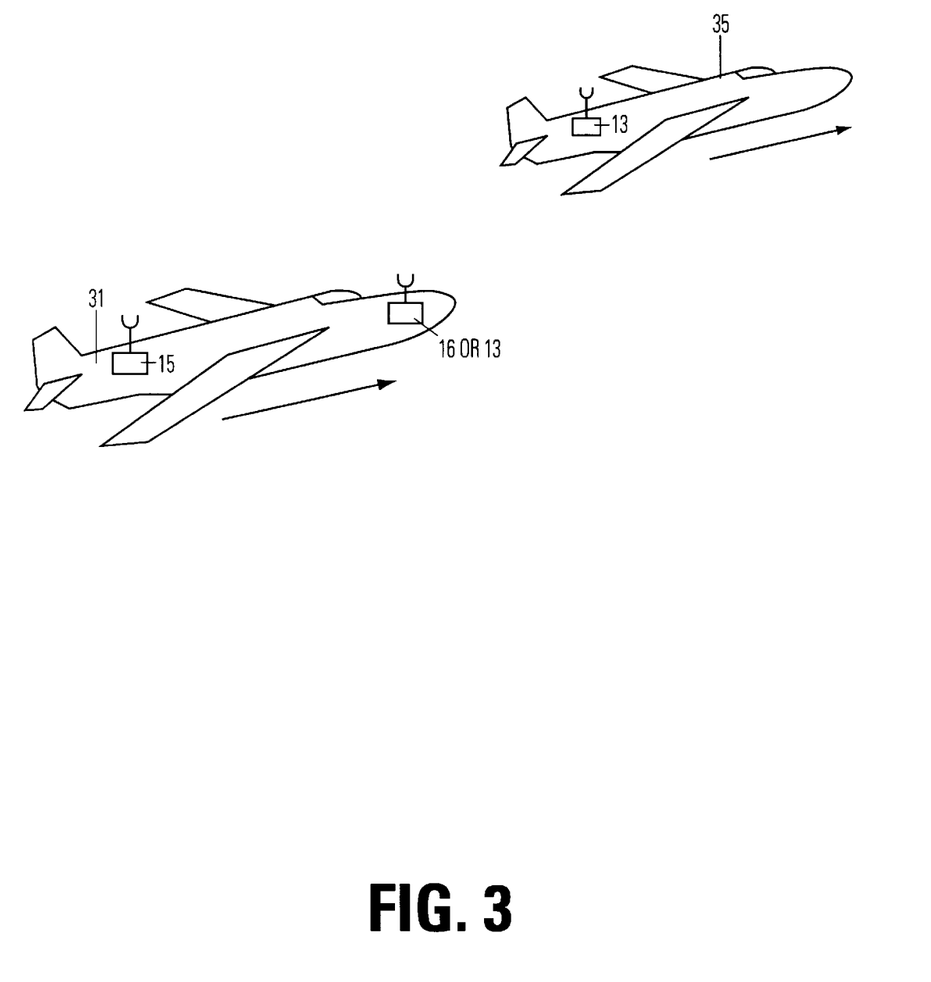

If the vehicle 31 is an airborne vehicle located on the ground, the vehicle can be guided to or away from a ground-based tie-down, refueling or loading/unloading location or other structure for the vehicle. Alternatively, an airborne vehicle 31 may be guided toward another airborne vehicle for refueling or toward a landing on a motionless or moving aircraft carrier 35, as illustrated in FIG. 3. Here, one or more of the rover stations 15, 16 are located on the vehicle 31, and the mobile reference station 13 is optionally located on the vehicle or adjacent to or contiguous with the target structure.

One problem that must be overcome initially in use of carrier phase positioning is the presence of phase integer ambiguities in the carrier phase measurements for the tracked satellites. An integer search technique for identification of the phase integers often takes account of the statistical nature of discrete integer combinations that are realistic candidates for the proper phase integers. The number of possible combinations to be searched is enormous, unless the number of candidates can be reduced initially. If the relative location of two stations is known precisely, the number of initial phase integer combination candidates can be reduced to as few as one. If the horizontal or vertical separation distance between the two stations is known with high accuracy in the SATPOS frame, the number of phase integer combination candidates can be reduced to a modest number that can be searched relatively quickly and can reliably produce the correct results. The number of phase integer combination candidates is reduced by sequentially applying position information provided by the electro-optical survey measurements. Several phase integer ambiguity resolution techniques are discussed and compared by S. Han and C. Rizos in "Comparing GPS Ambiguity Resolution Techniques", GPS World, vol. 8, no. 10 (October 1997), pp. 54–61.

Another serious problem with carrier phase location determination is the possibility of SATPOS signal interruptions at one or both SATPOS stations. When a SATPOS satellite signal is lost, the phase integer(s) must be redetermined. Signal interruption can easily occur in urban or other built-up areas where tall structures interfere with or produce multipath SATPOS signals. A separation vector between two SATPOS stations, specified by three coordinate differences, or by a separation vector magnitude and two or more spherical angles relative to a fixed direction, may be known initially. However, one or both of these stations may have moved when the signal is interrupted so that the separation vector must be established again.

The invention determines a separation vector R(1;2) between first and second stations, optionally by use of one or more wave retro-directors that are mounted on the second station and facing the first station. An electromagnetic wave beam is directed from the first station toward the second station, and the beam is retro-reflected from the second station toward the first station. The station-to-station separation vector is obtained by electro-optical phase measurement techniques. Once the separation vector is re-established, after an SATPOS signal interruption occurs, the phase integer combination for the two stations is promptly redetermined, and static or kinematic surveying can continue.

Preferably, the station-to-station separation vector is determined using RTK information, or the EDM-determined separation vector is checked using RTK information, as part of a total station approach that relies upon EDM techniques and RTK techniques for location determination.

Although the preceding development focuses on receipt and analysis of SATPOS signals, any of several sets of location determination (LD) signals. including GPS signals, GLONASS signals, low earth orbit (LEO) signals (e.g., Iridium signals) and other satellite-based LD signals can be used to determine the locations of the mobile reference station and the rover station(s), using an RTK approach and optionally using LD signal corrections (an analogue of carrier phase or code phase corrections).

Figure 4:
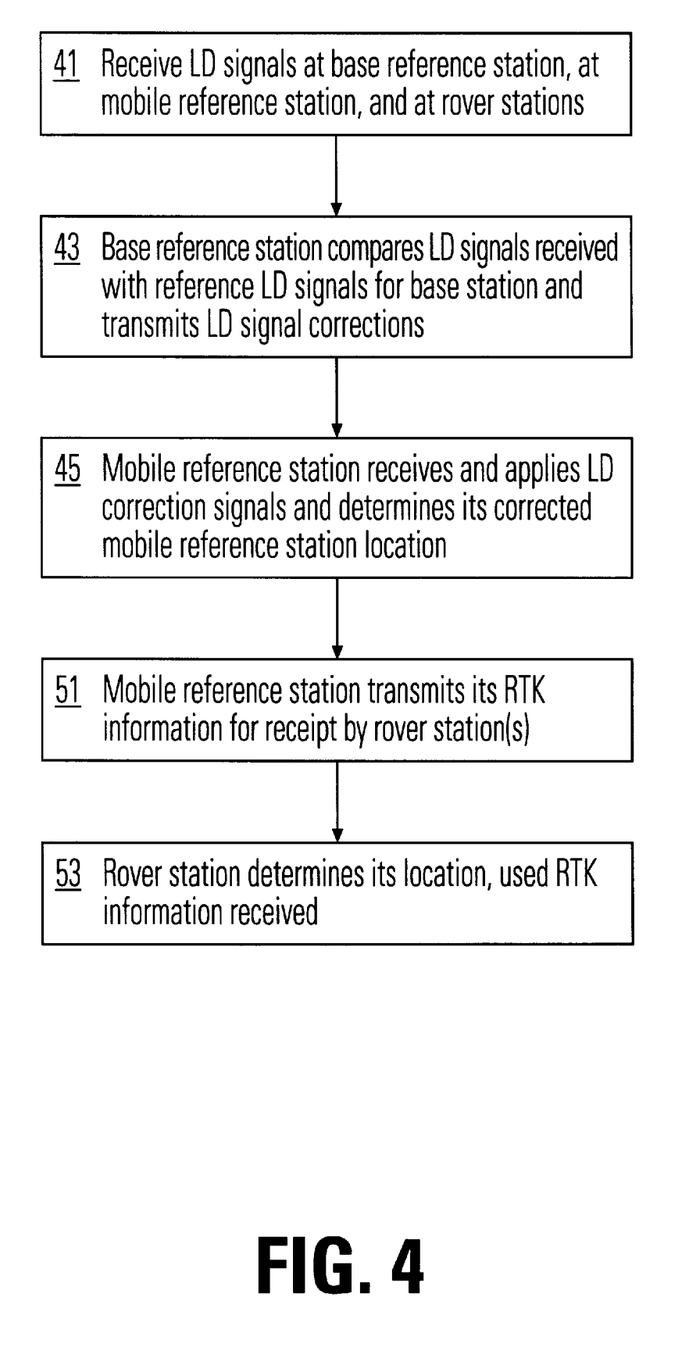
FIGS. 4 and 5 are flow charts illustrating suitable procedures for practicing the invention.
Figure 5:
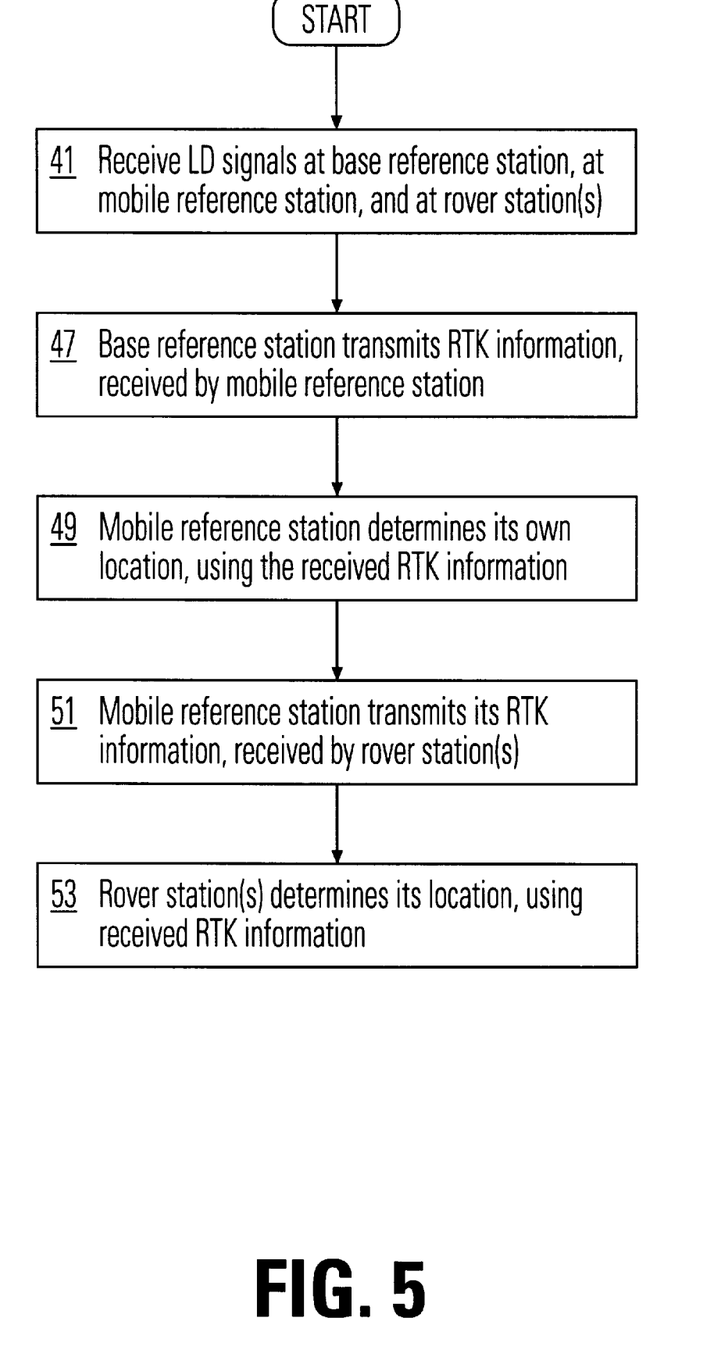

FIGS. 4 and 5 are flow charts illustrating suitable procedures for practicing the invention. In step 41 of FIG. 4, LD signals are received at a base reference station, a mobile reference station and one or more rover stations. In step 43, the base station compares the LD signals received with the LD signals that should have been received, based on the known locations of the base reference station and of the LD signal sources, and transmits LD signal corrections. In step 45, the mobile reference station receives and applies LD signal corrections (received from the base reference station or from analysis at the mobile reference station), corrects the corresponding LD signals received by the mobile reference station, and determines a corrected mobile reference station location. In step 51, the mobile reference station transmits, and the rover station receives from the mobile reference station, RTK information. In step 53, the rover station determines the rover station location, using an RTK approach.

Step 41 of FIG. 5 is the same as step 41 in FIG. 3. In step 47 of FIG. 5, the base station transmits, and the mobile reference station receives, RTK information. In step 49, the mobile reference station determines its own location, using the received RTK information. Steps 51 and 53 are the same as steps 51 and 53 of FIG. 4.

The invention provides consistency checks for the presence of errors in the locations of intermediate stations in a survey or navigation chain. For example, if the mobile reference station 13, the first rover station 15 and the second rover station 16 form an ordered chain (in that order), knowledge of the locations of the mobile reference station and of the first rover station are used in an RTK analysis to sequentially determine the locations of the first rover station and of the second rover station, respectively. Reversing the procedure, once the second rover station location is determined, the mobile reference station location and the first rover station location can be redetermined, using RTK analysis and knowledge of the second rover station location. The redetermined mobile reference station location and the redetermined first rover station location can be compared with the corresponding originally determined locations for these two stations, as a consistency check. This approach can also be applied to three or more consecutive rover stations in an ordered chain. If the redetermined location of a surveyed station differs substantially from the originally determined location, by more than a selected threshold value, such as 20–40 cm, this may indicate that at least one of the originally determined survey locations is erroneous.

What is claimed is:

1. A method for determining location of a rover station, the method comprising the steps of:

providing information on a known location for a base reference station and real time kinematic (RTK) information on base station location for a mobile reference station that is spaced apart from the base station;

using the base station RTK information to determine a location of the mobile reference station relative to the base station location;

providing the mobile reference station location and RTK information concerning the mobile reference station for a first rover station that is spaced apart from the mobile reference station;

using the mobile reference station location information and RTK information to determine the first rover station location relative to the mobile reference station location;

using the first rover station location and the RTK information concerning the first rover station to redetermine the mobile reference station location;

comparing the redetermined mobile reference station location with the location of the mobile reference station, as originally determined; and when the redetermined mobile reference station location does not substantially agree with the originally determined mobile reference station location, determining that the originally determined location of at least one of the mobile reference station and the first rover station is erroneous.

2. The method of claim 1, further comprising the steps of:

providing said first rover station location and real time kinematic (RTK) information concerning said first rover station for at least a second rover station that is spaced apart from said first rover station; and using said first rover station location information and RTK information to determine a second rover station location relative to said first rover station location.

3. The method of claim 2, further comprising the steps of:

using said second rover station location and RTK information concerning said second rover station to redetermine at least one of said mobile reference station location and said first rover station location;

comparing at least one of the redetermined mobile reference station location and the redetermined first rover station location with said corresponding location of said mobile reference station or of said first rover station, as originally determined; and when the redetermined location does not substantially agree with said corresponding location as originally determined, determining that said originally determined location of at least one of said mobile reference station, said first rover station and said second rover station is erroneous.

4. The method of claim 1, further comprising the steps of:

positioning said mobile reference station and said first rover station at spaced apart first and second vehicle locations on a selected vehicle, where the first and second vehicle locations are known relative to the vehicle; and using said determined locations of said mobile reference station and said rover station to determine an angular heading of a line joining said mobile reference station and said rover station location.

5. The method of claim 1, further comprising the steps of:

positioning said first rover station at a selected location on a selected vehicle, where the selected location is known relative to the vehicle;

providing a location of a selected structure, relative to at least one of said base station location and said mobile reference station location; and directing the vehicle toward the structure, using at least one of said mobile reference station location and said first rover station location.

6. The method of claim 5, further comprising the step of selecting said vehicle from a class of vehicles consisting of a land vehicle, a waterborne vehicle and an airborne vehicle.

7. A method for determining location of a rover station, the method comprising the steps of:

providing a mobile reference station that receives location determination (LD) signals from a plurality of LD signal sources and uses the LD signals to determine the mobile reference station location;

providing LD correction signals that allow at least partial correction of the LD signals received by the mobile reference station, and using the LD correction signals to determine a corrected mobile reference station location;

providing the corrected mobile reference station location and real time kinematic (RTK) information on mobile reference station location for a first rover station that is spaced apart from the mobile reference station;

using the mobile reference station corrected location information and RTK information to determine the first rover station location relative to the corrected mobile reference station location;

using the first rover station location and RTK information concerning the first rover station to redetermine the mobile reference station location;

comparing the redetermined mobile reference station location with the location of said mobile reference station, as originally determined; and when the redetermined mobile reference station location does not substantially agree with the originally determined mobile reference station location, determining that the originally determined location of at least one of the mobile reference station and the first rover station is erroneous.

8. The method of claim 7, further comprising the steps of:

providing said first rover station location and real time kinematic (RTK) information concerning said first rover station for at least a second rover station that is spaced apart from said first rover station; and using said first rover station location information and RTK information to determine the second rover station location relative to said first rover station location.

9. The method of claim 8, further comprising the steps of:

using said second rover station location and RTK information concerning said second rover station to redetermine at least one of said mobile reference station location and said first rover station location;

comparing at least one of the redetermined mobile reference station location and the redetermined first rover station location with said corresponding location of said mobile reference station or of said first rover station, as originally determined; and when the at least one redetermined location does not substantially agree with said corresponding location as originally determined, determining that said originally determined location of at least one of said mobile reference station, said first rover station and said second rover station is erroneous.

10. The method of claim 7, further comprising the steps of:

positioning said mobile reference station and said first rover station at spaced apart first and second vehicle locations on a selected vehicle, where the first and second vehicle locations are known relative to the vehicle; and using said determined locations of said mobile reference station and said rover station to determine an angular heading of a line joining said mobile reference station and said rover station location.

11. The method of claim 7, further comprising the steps of:

positioning said first rover station at a selected location on a selected vehicle, where the selected location is known relative to the vehicle;

providing a location of a selected structure, relative to said mobile reference station location; and directing the vehicle toward the structure, using at least one of said mobile reference station location and said first rover station location.

12. The method of claim 11, further comprising the step of selecting said vehicle from a class of vehicles consisting of a land vehicle, a waterborne vehicle and an airborne vehicle.

13. The method of claim 7, further comprising the step of selecting said LD signals from a class consisting of signals produced by GPS signal sources, GLONASS signal sources and LEO signal sources.

* * * * *